United States Patent
Lee

(10) Patent No.: US 12,374,265 B2
(45) Date of Patent: Jul. 29, 2025

(54) DISPLAY APPARATUS

(71) Applicant: LG Display Co., Ltd., Seoul (KR)

(72) Inventor: Wonsuk Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 38 days.

(21) Appl. No.: 18/483,471

(22) Filed: Oct. 9, 2023

(65) Prior Publication Data

US 2024/0185763 A1 Jun. 6, 2024

(30) Foreign Application Priority Data

Dec. 5, 2022 (KR) ........................ 10-2022-0167996

(51) Int. Cl.
*G09G 3/20* (2006.01)
*G06F 3/14* (2006.01)
*G09G 3/3208* (2016.01)

(52) U.S. Cl.
CPC ......... *G09G 3/2096* (2013.01); *G06F 3/1438* (2013.01); *G09G 3/3208* (2013.01); *G09G 2310/08* (2013.01); *G09G 2320/02* (2013.01); *G09G 2360/12* (2013.01); *G09G 2370/22* (2013.01)

(58) Field of Classification Search
CPC ......... G09G 3/2096; G09G 2310/0243; G09G 2340/0435; G09G 2320/02; G09G 5/001
See application file for complete search history.

(56) References Cited

U.S. PATENT DOCUMENTS

| | | | |
|---|---|---|---|
| 2015/0339967 A1* | 11/2015 | Shin ..................... | G09G 3/2003 345/690 |
| 2022/0051631 A1* | 2/2022 | Cheon .................. | G09G 3/3275 |
| 2023/0030201 A1* | 2/2023 | Youn ..................... | G09G 3/3406 |
| 2023/0410732 A1* | 12/2023 | Chou ....................... | G06F 3/14 |

FOREIGN PATENT DOCUMENTS

KR 20200042229 A 4/2020

* cited by examiner

*Primary Examiner* — Yuzhen Shen
(74) *Attorney, Agent, or Firm* — Seed IP Law Group LLP

(57) ABSTRACT

A display apparatus includes at least one display panel including a pixel array configured by a plurality of pixels. The display apparatus further includes at least one controller which receives image data from a host system and controls the driving of the display panel to display the image data. The controller transmits a frame synchronization signal notifying a transmission start time for every image frame included in the image data to the host system, detects a reception start time for an image frame received from the host system, and delays a transmission start time of a data signal corresponding to the image frame to the display panel based on a difference between a start time of the frame synchronization signal and the reception start time.

10 Claims, 13 Drawing Sheets

DISPLAY APPARATUS

CROSS-REFERENCE TO RELATED APPLICATIONS

This application claims the priority of Korean Patent Application No. 10-2022-0167996 filed on Dec. 5, 2022, in the Korean Intellectual Property Office, the disclosure of which is incorporated herein by reference.

BACKGROUND

Technical Field

The present disclosure relates to a display apparatus, and more particularly, to a display apparatus which performs display synchronization according to input data delay.

Description of the Related Art

The field of display technology that visually expresses electrical information signals has developed rapidly, and in response to this, various display apparatuses with excellent performance of thinning, lightening, and low power consumption are being developed. Examples of the display apparatus may include a liquid crystal display (LCD) device, an organic light emitting display (OLED) device, and the like.

The organic light emitting display device is a self-emitting display device so that a separate light source is not necessary, which is different from the liquid crystal display device. Therefore, the organic light emitting display device may be manufactured to have light weight and small thickness. Further, since the organic light emitting display device is driven at a low voltage, it is advantageous not only in terms of power consumption, but also in terms of excellent color expression ability, the response speed, the viewing angle, and the contrast ratio (CR), so that the light emitting display device is being studied as next generation displays.

BRIEF SUMMARY

The present disclosure provides a display apparatus which suppresses a display mosaic problem by adaptively adjusting display synchronization in response to delay of input image data.

The present disclosure provides a display apparatus which suppresses a display mosaic problem by controlling display synchronization between a plurality of display panel driving circuit chips even though multi-chips are applied.

Technical features of the present disclosure are not limited to those above-mentioned, and other technical features, which are not mentioned above, can be clearly understood by those skilled in the art from the following descriptions.

According to an aspect of the present disclosure, a display apparatus includes at least one display panel including a pixel array configured by a plurality of pixels; and at least one controller which receives image data from a host system and controls the driving of the display panel to display the image data, and the controller transmits a frame synchronization signal notifying a transmission start time for every image frame included in the image data to the host system, detects a reception start time for an image frame received from the host system, and delays a transmission start time of a data signal corresponding to the image frame to the display panel based on a difference between a start time of the frame synchronization signal and the reception start time of the image frame.

Other detailed matters of the exemplary embodiments are included in the detailed description and the drawings.

According to the exemplary embodiment of the present disclosure, even though input image data is delayed, a tearing effect which is a display mosaic problem to be generated due to the overlapping of a delayed image frame and a previous image frame may be suppressed.

Further, according to the exemplary embodiment of the present disclosure, a driving signal which suppresses the display mosaic problem between a plurality of display panel driving circuit chips in a display apparatus in which multi-chips are applied may be synchronized.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
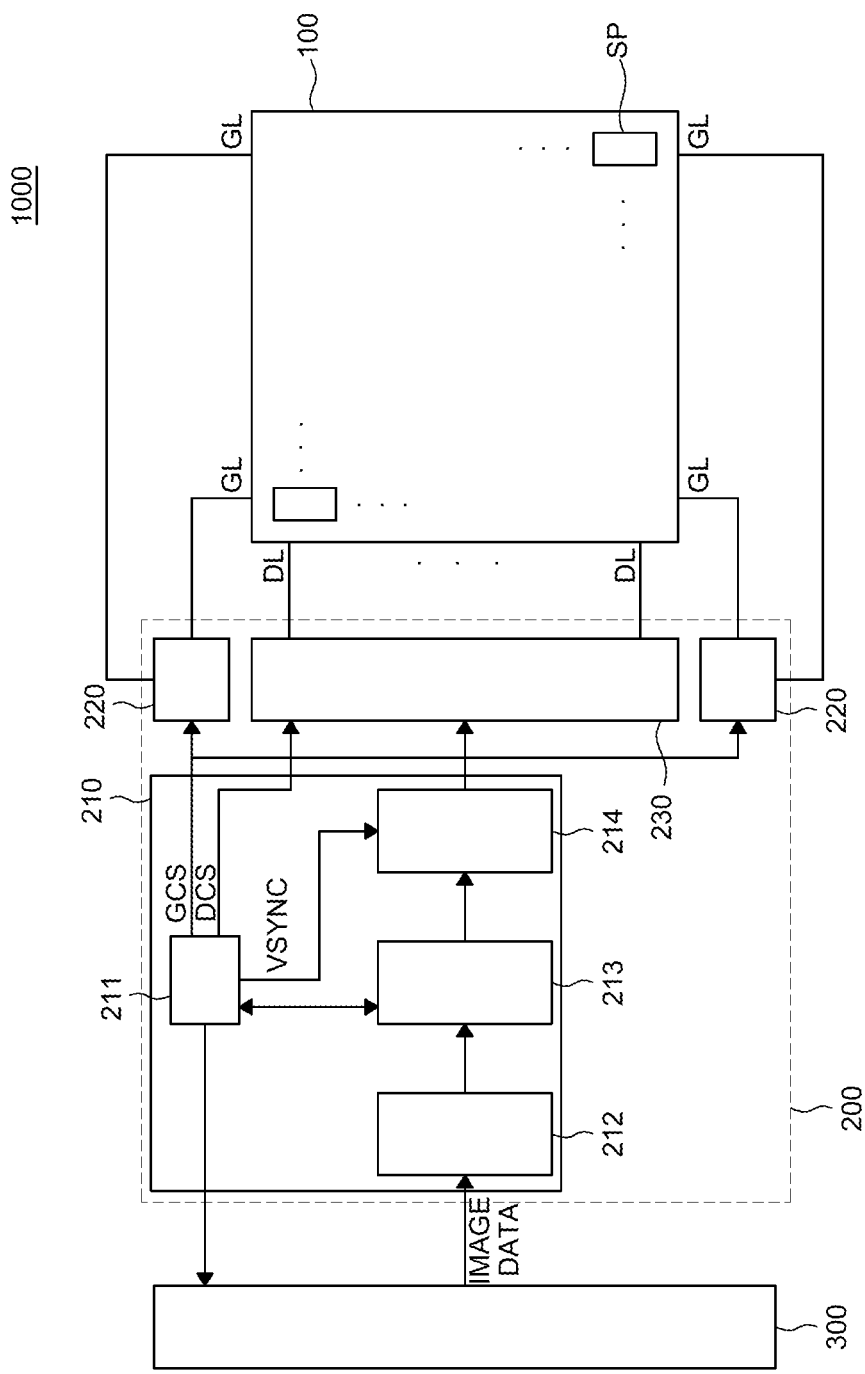
FIG. 1 is a block diagram of a display apparatus according to an exemplary embodiment of the present disclosure.

Technical benefits and characteristics of the present disclosure and a method of achieving the technical benefits and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto.

Like reference numerals generally denote like elements throughout the specification. Further, in the following description of the present disclosure, a detailed explanation of known related technologies may be omitted to avoid unnecessarily obscuring the subject matter of the present disclosure.

The terms such as "including," "having," and "consist of" used herein are generally intended to allow other components to be added unless the terms are used with the term "only." Any references to singular may include plural unless expressly stated otherwise.

When the position relation between two parts is described using the terms such as "on," "above," "below," and "next," one or more parts may be positioned between the two parts unless the terms are used with the term "immediately" or "directly." Although the terms "first," "second," and the like are used for describing various components, these components are not confined by these terms. These terms are merely used for distinguishing one component from the other components. Therefore, a first component to be mentioned below may be a second component in a technical concept of the present disclosure.

The term "exemplary" as used herein includes and means a suitable example and does not mean and is not limited to a required or preferred example.

A "predetermined" value, parameter, threshold, condition or setting can be dynamically determined or adjusted by a machine with or without human inputs. A "predetermined" value, parameter, threshold, condition or setting does not mean or limit to that the value, parameter, threshold, condition or setting is fixed or is input by a human.

The features of various embodiments of the present disclosure may be partially or entirely coupled to or combined with each other and may be interlocked and operated in technically various ways, and the embodiments may be carried out independently of or in association with each other.

Hereinafter, an exemplary embodiment of the present disclosure will be described with reference to FIGS. 1 to 5.

FIG. 1 is a block diagram of a display apparatus according to an exemplary embodiment of the present disclosure.

In FIG. 1, for the convenience of description, among various components of the display apparatus 1000, only a display panel 100, a controller 210, a gate driver 220, a data driver 230, and a host system 300 are illustrated. As illustrated in FIG. 1, in the display apparatus 1000 according to the exemplary embodiment of the present disclosure, the controller 210, the gate driver 220, and data driver 230 may be integrated in one display panel driving circuit chip 200.

The gate driver 220 supplies a plurality of scan signals to a plurality of gate lines GL in accordance with a plurality of gate control signals GCS supplied from the controller 210. In FIG. 1, it is illustrated that two gate drivers 220 are disposed at one side of the display panel 100 to be spaced apart from the display panel 100 and two gate drivers 220 are disposed to be spaced apart from each other. Even though the gate drivers 220 may be disposed in a gate in panel (GIP) manner, but the number of gate drivers 220 and the placement are not limited thereto.

The data driver 230 converts image data input from the controller 210 into a data signal using a reference gamma voltage in accordance with a plurality of data control signals DCS supplied from the controller 210. Further, the data driver 230 supplies the converted data signal to the plurality of data lines DL.

The controller 210 aligns image data RGB input from the host system 300 to supply the aligned image data to the data driver 230.

The controller 210 generates various signals required to drive the display panel 100, for example, a clock signal, a data enable signal, a horizontal/vertical synchronization signal and may generate a gate control signal GCS and a data control signal DCS using this signal. Further, the controller 210 supplies the gate control signal GCS and the data control signal DCS to the gate driver 220 and the data driver 230, respectively, to control the gate driver 220 and the data driver 230.

The host system 300 is connected to the controller 210 through various interface circuits and includes a graphic processor unit GPU and a memory to process an input image source according to a predetermined application in accordance with a purpose and then transmit the input image source to the controller 210.

The host system 300 may include a system on chip (SoC) embedded with a scaler and converts digital video data of the input image into image data having a format suitable to be displayed on the display panel 100 to output the converted image data. The image source is input in a streaming format so that the image source needs to be temporally stored in the memory for data processing. Therefore, in order to reduce the cost and the complexity required for data processing, generally, the image source may be processed in one frame unit.

A graphic processor unit GPU of the host system 300 may perform a data rendering operation by image-processing the image data in one frame unit and storing the image-processed frame data in the memory using a draw command. The memory of the host system 300 may be divided into a plurality of areas to perform the data rendering operation and a data transmission operation to the controller 210 in parallel.

The host system 300 is connected to external video source devices, for example, a navigation system, a set-top box, a DVD player, a blue-ray player, a personal computer (PC), a home theater system, a broadcasting receiver, and a phone system to receive image data from external video source devices.

The display panel 100 is a configuration which displays images and includes the plurality of sub pixels SP. In the display panel 100, the plurality of gate lines GL and the plurality of data lines DL intersect each other and the plurality of sub pixels SP is connected to the gate lines GL and the data lines DL, respectively. Even though not illustrated in the drawings, the plurality of sub pixels SP may be connected to a high potential power line, a low potential power line, an initialization signal line, and an emission control signal line.

The plurality of sub pixels SP is a minimum unit which configures a screen and each of the plurality of sub pixels SP includes a light emitting diode and a driving circuit for driving the light emitting diode. The plurality of light emitting diodes may be defined in different ways depending on a type of the display panel 100. For example, when the display panel 100 is an organic light emitting display panel, the light emitting diode may be an organic light emitting diode which includes an anode, an organic layer, and a cathode. In addition to this, as the light emitting diode, a quantum-dot light emitting diode (QLED) including quantum dots (QD) and an inorganic light emitting diode (LED) may be further used. Hereinafter, even though the description will be made under the assumption that the light emitting diode is the organic light emitting diode, the type of the light emitting diode is not limited thereto.

A pixel circuit is a circuit for controlling the driving of the light emitting diode. For example, the pixel circuit may be configured to include a plurality of transistors and one or more capacitors, but is not limited thereto.

The display panel 100 includes a pixel array configured by a plurality of pixels including a plurality of sub pixels SP. The plurality of sub pixels SP included in one pixel may be any one of a red pixel, a green pixel, a blue pixel, and a white pixel. That is, one unit pixel which displays images may include a red pixel, a green pixel, and a blue pixel which are adjacent to each other, or a red pixel, a green pixel, a blue pixel, and a white pixel which are adjacent to each other.

The controller 210 receives image data input from the host system 300 to control the driving of the display panel 100 to display the received image data. To this end, the controller 210 transmits a frame synchronization signal notifying when to start transmission for every image frame included in image data, to the host system 300.

Specifically, the controller 210 includes a timing signal generator 211, an interface unit 212, a memory 213, and a data processor 214.

The interface unit 212 receives input image data IMAGE DATA through the interface circuit of the host system 300 to transmit the input image data to the memory 213.

The memory 213 stores the image data received through the interface unit 212 in the unit of image frame.

The timing signal generator 211 generates a frame synchronization signal for a subsequent image frame in response to a completion time of transmission of a data signal corresponding to an image frame stored in the memory 213 to the display panel 100 to transmit the signal to the host system 300. Further, the timing signal generator 211 transmits the gate control signal GCS to the gate driver 220, transmits the data control signal DCS to the data driver 230, and transmits various signals for driving the display panel 100 (that is, a clock signal, a data enable signal, a horizontal/vertical synchronization signal), to the data processor 214. By doing this, the image according to the input image data is displayed on the display panel 100. Even though in FIG. 1, it is only illustrated that the timing signal generator 211 transmits the vertical synchronization signal VSYNC to the data processor 214, actually, various driving signals for driving the display panel 100 may be transmitted, respectively.

The data processor 214 transmits an image frame stored in the memory 213 to the data driver 230 according to various driving signals generated from the timing signal generator 211 to allow the data driver 230 to transmit a data signal corresponding to the image frame to the display panel 100. The data processor 214 converts the image frame to be fit with a data signal format used by the data driver 230 to transmit the converted image frame to the data driver 230. Accordingly, when a specific gate line GL of the display panel 100 is activated, the data driver 230 converts digital data corresponding to the image frame received from the controller 210 into an analog data voltage (that is, a data signal) to supply the analog data voltage to a plurality of data lines DL of the display panel 100.

A method of controlling the pixel driving of the display panel 100 by the controller 210 will be described in more detail with reference to FIG. 2.

Figure 2:
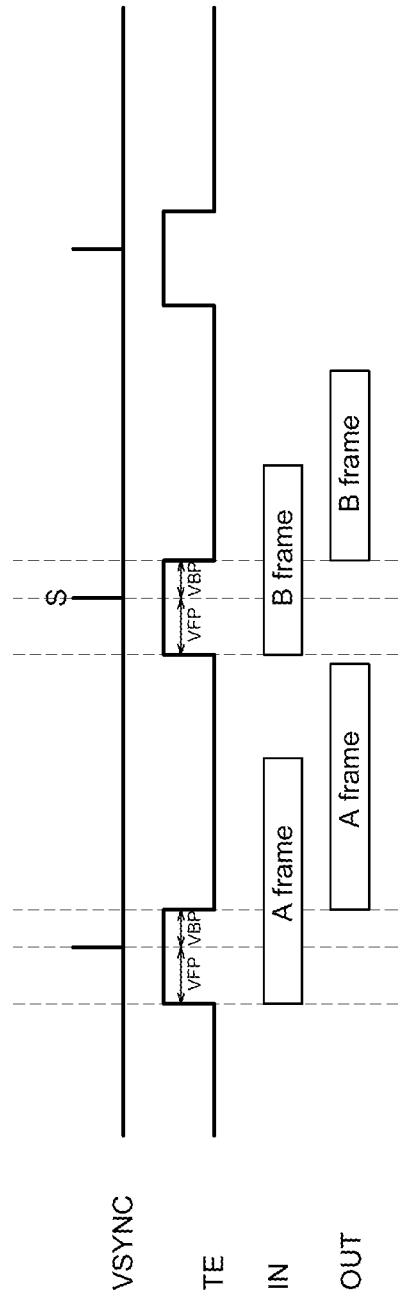
FIG. 2 is a timing diagram for explaining an example of a driving signal of a display apparatus according to an exemplary embodiment of the present disclosure.

FIG. 2 is a timing diagram for explaining an example of a driving signal for pixel driving of a display apparatus according to an exemplary embodiment of the present disclosure.

Referring to FIG. 2, the timing signal generator 211 generates a frame synchronization signal TE for each image frame of input image data to transmit the frame synchronization signal to the host system 300. In response to this, an image frame received in response to a corresponding frame synchronization signal TE, among image frames which are received from the host system 300 to the controller 210, starts to be stored in the memory 213. The image frame stored in the memory 213 starts to be supplied to the display panel 100 based on the vertical synchronization signal VSYNC which is generated by the timing signal generator 211 when a predetermined period elapses from a start time of the frame synchronization signal TE.

In FIG. 2, an image frame received by the controller 210 is denoted by "IN," an image frame which is supplied to the display panel 100 through a data driver 230 in accordance with the control of the controller 210 is denoted by "OUT." "A frame" and "B frame" denoted for "IN" and "OUT" are used to distinguish the image frames and may substantially refer to image data or data signal. This is applied to the timing diagrams according to the exemplary embodiments of the present disclosure to be described below in the same way.

Specifically, referring to FIG. 2, the vertical synchronization signal VSYNC is generated at a time when a vertical front porch (VFP) elapses from a time when a frame synchronization signal TE for an image frame A (A frame) which is a previous image frame is generated (that is, a time when the image frame A (frame A) starts to be received from the host system 300).

In addition, the image frame A (A frame) stored in the memory 213 is supplied to the display panel 100 through the data driver 230 at a time when the vertical back porch (VBP) elapses from the vertical synchronization signal VSYNC.

Next, on the basis of a completion time of transmission of the image frame A (A frame) to the display panel 100, a frame synchronization signal TE for an image frame B (B frame) which is a subsequent image frame is generated.

In addition, a vertical synchronization signal S which becomes a reference for providing the image frame B (B frame) to the display panel 100 is generated at a time when the vertical front porch VFP elapses from a time when a frame synchronization signal TE for the image frame B (B frame) is generated (that is, a time to start reception of the image frame B (B frame) from the host system 300).

Next, the image frame B (B frame) stored in the memory 213 is supplied to the display panel 100 through the data driver 230 at a time when the vertical back porch (VBP) elapses from the vertical synchronization signal S.

As described above, the controller 210 repeatedly generates and outputs a driving signal as described above, for the plurality of image frames from the host system 300.

In the meantime, a complexity of an input image transmitted from the host system 300 may change in real time. That is, a time required to render the input image is longer for a complex image frame than for a simple image frame. Therefore, a time required to transmit a previous image frame in the host system 300 may not be consistent with a time required to render data of a subsequent image frame. For example, when an N-th image frame is more complex than an N–1-th image frame (N is a natural number of 2 or larger), the graphic processor unit GPU of the host system 300 may perform the rendering operation for the N-th image frame at a completion time of transmission of the N–1-th image frame to the controller 210. When an overload occurs in the data processing in the host system 300, the processing of the graphic processor unit GPU of the host system 300 may be momentarily delayed.

A method of controlling the pixel driving of the display panel 100 by the controller 210 when the input image data is delayed as described above will be described in detail with reference to FIGS. 3 to 5.

Figure 3:
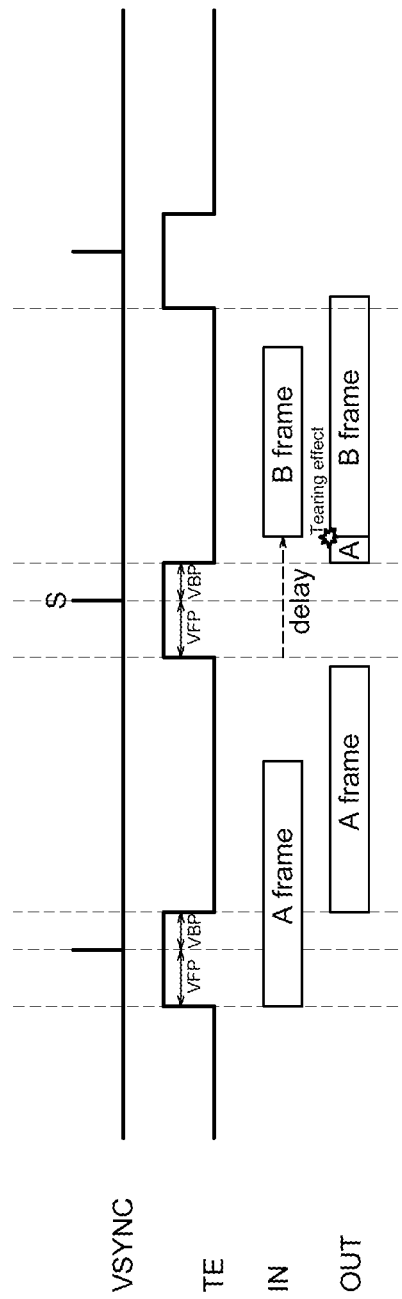
FIG. 3 is a timing diagram for explaining a case when input image data is delayed during pixel driving of a display apparatus, according to an exemplary embodiment of the present disclosure.

FIG. 3 is a timing diagram for explaining a case when input image data is delayed during pixel driving of a display apparatus, according to an exemplary embodiment of the present disclosure. FIG. 4 is a timing diagram for explaining another example of a driving signal of a display apparatus according to an exemplary embodiment of the present disclosure. FIG. 5 is a timing diagram for explaining still another example of a driving signal of a display apparatus according to an exemplary embodiment of the present disclosure.

First, referring to FIG. 3, the timing signal generator 211 may periodically generate a frame synchronization signal TE for a subsequent image frame. For example, after completion of transmission of the data signal according to the image frame A (A frame) which is a previous image frame to the display panel 100, the timing signal generator 211 generates a frame synchronization signal TE for the image frame B (B frame) according to a predetermined period.

At this time, when the transmission for the image frame B (B frame) is delayed in the host system 300, the image frame B (B frame) may not be received until the vertical back porch (VBP) elapse after the vertical synchronization signal S for the image frame B (B frame) is generated.

In this case, the previous image frame (that is, the image frame A (A frame)) stored in the memory 213 of the controller 210 is supplied to the display panel 100 through the data driver 230 to display an image at a time when the vertical back porch (VBP) elapses. When the delayed image frame B (B frame) starts to be received in a state in which the image of the image frame A (A frame) is displayed through the display panel 100, as illustrated in FIG. 3, the image frame B (B frame) is displayed while displaying the image frame A (A frame) to cause a tearing effect which is a display mosaic problem.

In order to suppress the display mosaic problem, the controller 210 detects a time for the controller 210 to start receiving image frame which is transmitted by the host system 300 in response to the frame synchronization signal TE. Further, the controller 210 delays the transmission start time of the data signal corresponding to the image frame to the display panel 100 based on a difference between a start time of transmitting the frame synchronization signal TE to the host system 100 and a start time of receiving the image frame from the host system 300.

For example, when a start time of receiving the N-th image frame (N is a natural number of 2 or larger) from the host system 300 is detected within a predetermined delay limit period from a start time of an N-th frame synchronization signal, the timing signal generator 211 generates an internal timing signal so as to correspond to a reception start time of the N-th image frame. Further, the data signal corresponding to the N-th image frame stored in the memory 213 is controlled to be transmitted to the display panel 100 based on the internal timing signal.

Figure 4:
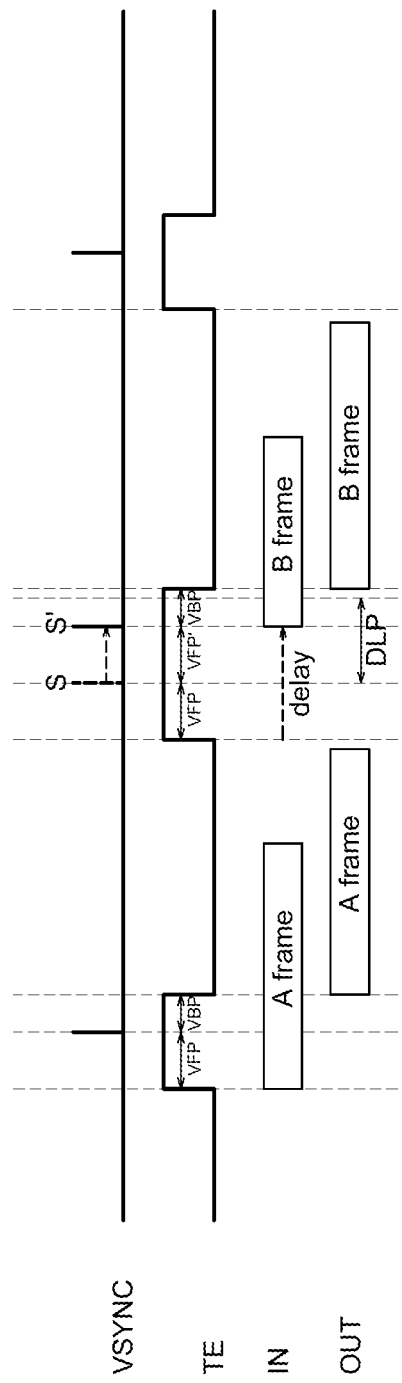
FIG. 4 is a timing diagram for explaining another example of a driving signal of a display apparatus according to an exemplary embodiment of the present disclosure.

Referring to FIG. 4, the timing signal generator 211 monitors the memory 213 in real time to detect a time when the N-th image frame (that is, image frame B (B frame)) which is currently received starts to be received (that is, a start time of writing the image frame B (B frame) in the memory 213). Further, when the image frame B (B frame) is detected within a delay limit period (VFP+DLP) from a start time of the frame synchronization signal TE, the timing signal generator 211 generates a vertical synchronization signal S' which is an internal timing signal so as to correspond to an actual reception start time of the image frame B (B frame).

That is, as illustrated in FIG. 4, a vertical synchronization signal S which needs to be generated at a time when the vertical front porch (VFP) elapses from a start time of the frame synchronization signal TE for the image frame B (B frame) is not generated. However, a vertical synchronization signal (S') is delayed and generated at the time when the vertical front porch (VFP') has further elapsed from the time when the vertical synchronization signal S should have been generated. A data signal for the image frame B (B frame) is transmitted to the display panel 100 through the data driver 230 at a time when the vertical back porch VBP elapses from the delayed vertical synchronization signal S'.

Further, when a start time of receiving the N-th image frame (N is a natural number of 2 or larger) from the host system 300 is detected after the predetermined delay limit period from a start time of an N-th frame synchronization signal, the timing signal generator 211 cancels storing of the N-th image frame in the memory 213. Further, the timing signal generator 211 generates an internal timing signal so as to correspond to an end time of the delay limit period and controls the data signal corresponding to the N–1-th image frame stored in the memory 213 to be transmitted to the display panel 100 based on the internal timing signal.

Figure 5:
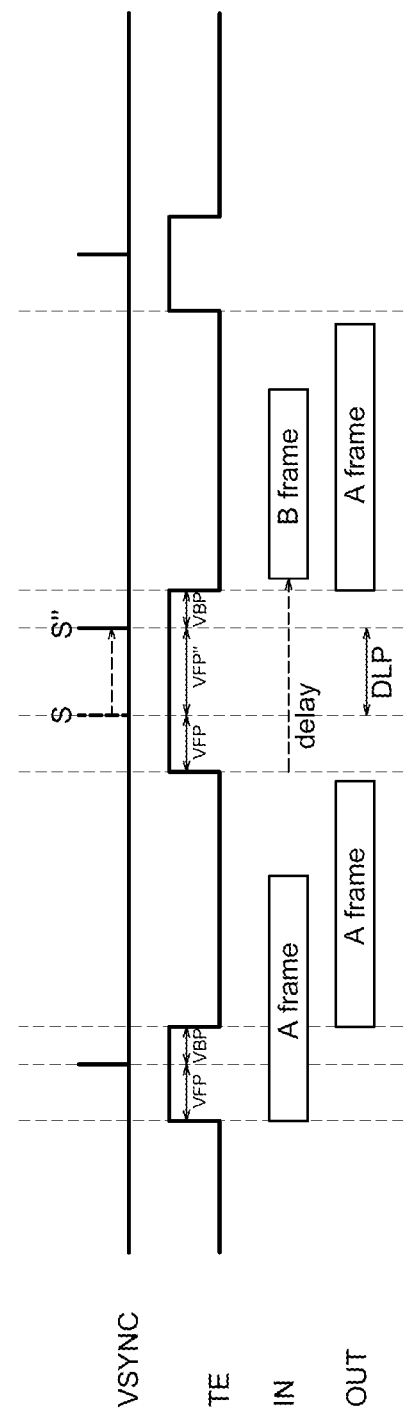
FIG. 5 is a timing diagram for explaining still another example of a driving signal of a display apparatus according to an exemplary embodiment of the present disclosure.

Referring to FIG. 5, the timing signal generator 211 monitors the memory 213 in real time to detect a start time of receiving the N-th image frame (that is, image frame B (B frame)) which is currently received (that is, a start time of writing the image frame B (B frame) in the memory 213). Further, when the image frame B (B frame) is detected after a delay limit period (VFP+DLP) from a start time of the frame synchronization signal TE, the timing signal generator 211 cancels the storing of the image frame B (B frame) in the memory 213 and generates a vertical synchronization signal S" which is an internal timing signal so as to correspond to an end time of the delay limit period VFP+DLP.

That is, as illustrated in FIG. 5, a vertical synchronization signal S which needs to be generated at a time when the vertical front porch (VFP) elapses from a start time of the frame synchronization signal TE for the image frame B (B frame) is not generated. However, the vertical synchronization signal (S") is delayed and generated at the time when the vertical front porch (VFP") has further elapsed from the time when the vertical synchronization signal S should have been generated. A data signal for an image frame A (frame A) which is a previous image frame, rather than the image frame B (B frame), is transmitted to the display panel 100 through the data driver 230 at a time when the vertical back porch VBP elapses from the delayed vertical synchronization signal S".

As described above, when the transmission of the input image frame from the host system 300 to the controller 210 is delayed, the display apparatus 1000 according to the exemplary embodiment of the present disclosure adaptively adjusts the generation time of the internal synchronization signal in accordance with the delayed condition to suppress the tearing effect which is the display mosaic problem. The display mosaic problem may be generated when the delayed image frame and the previous image frame overlap.

In the meantime, in FIGS. 1 to 5, it has been described that the display apparatus according to the exemplary embodiment of the present disclosure is a display apparatus including one display panel driving circuit chip 200, that is, applying a single chip.

A display apparatus according to another exemplary embodiment of the present disclosure may be a display apparatus which includes any one display panel or a plurality of display panels and drives one display panel to be divided or applies multi-chips including a plurality of display panel driving circuit chips to drive a plurality of display panels.

The display apparatus according to another exemplary embodiment of the present disclosure includes a plurality of display panels and a plurality of controllers may control the driving of different display panels, among the plurality of display panels. Further, the display apparatus according to another exemplary embodiment of the present disclosure may include one display panel and one display panel is divided into a plurality of areas and a plurality of controllers may control the driving of different areas of the plurality of areas of the display panel.

Hereinafter, for the convenience of description, it is described that a display apparatus according to another exemplary embodiment of the present disclosure is a display apparatus to which multi-chips are applied and a plurality of display modules is included, but is not limited thereto. That is, the display apparatus according to another exemplary embodiment of the present disclosure includes one display module and may divide and drive one display module with multi-chips.

Hereinafter, another exemplary embodiment of the present disclosure will be described with reference to FIGS. 6 to 13.

Figure 6:
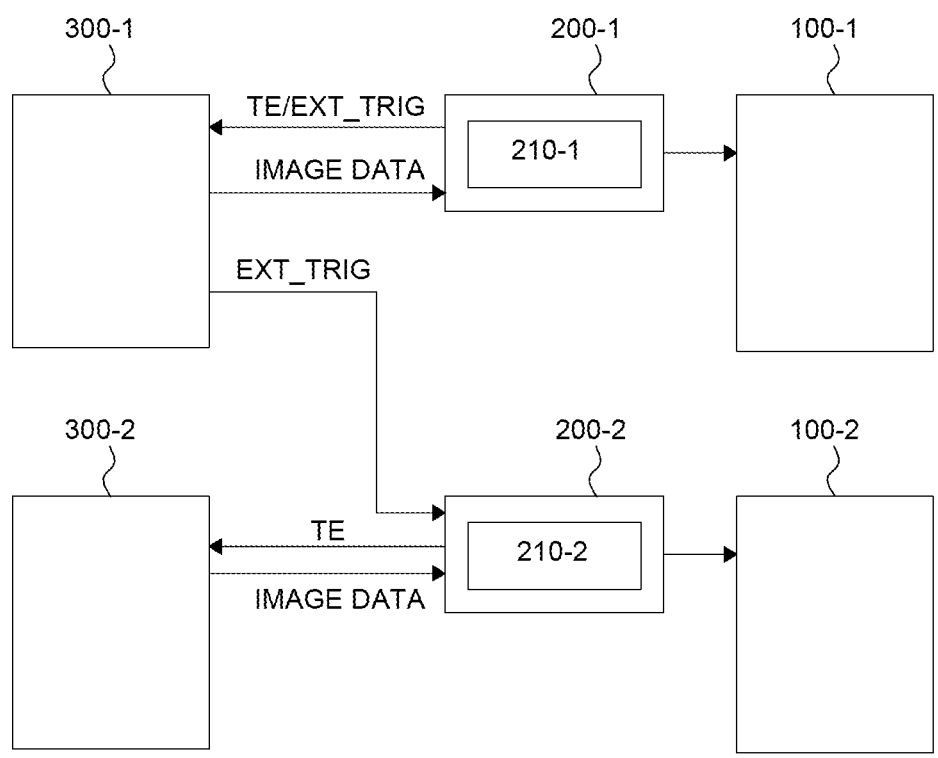
FIG. 6 is a block diagram of a display apparatus according to another exemplary embodiment of the present disclosure.

FIG. 6 is a block diagram of a display apparatus according to another exemplary embodiment of the present disclosure.

In FIG. 6, for the convenience of description, among various components of a display apparatus 2000, only a plurality of display panels 100-1 and 100-2, a plurality of controllers 210-1 and 210-2, and a plurality of host systems 300-1 and 300-2 are illustrated. These correspond to the components of the display apparatus 1000 according to the exemplary embodiment of the present disclosure described above with reference to FIG. 1.

However, in FIG. 6, detailed configurations 211, 212, 213, and 214 of the gate driver 220, the data driver 230, and the controller 210 described with reference to FIG. 1 are omitted. In contrast, the display apparatus 2000 according to another exemplary embodiment of the present disclosure includes all the detailed configurations 211, 212, 213, and 214 of the gate driver 220, the data driver 230, and the controller 210, which may be integrated in each display panel driving circuit chip 200-1 and 200-2.

With regard to detailed configurations of the display panels 100-1 and 100-2, the controllers 210-1 and 210-2, and the host systems 300-1 and 300-2 illustrated in FIG. 6 and detailed configurations of the gate driver, the data driver, and the controller which are omitted in FIG. 6, detailed description of repeated contents those described with reference to FIGS. 1 to 5 will be omitted.

The display apparatus 2000 according to another exemplary embodiment of the present disclosure includes first and second display modules. In this case, the first display module includes a first display panel 100-1, a first display panel driving circuit chip 200-1, and a first host system 300-1 and the second display module includes a second display panel 100-2, a second display panel driving circuit chip 200-2, and a second host system 300-2.

For reference, in FIG. 6, it is illustrated that the display apparatus 2000 according to another exemplary embodiment of the present disclosure includes a plurality of host systems 300-1 and 300-2 each including a graphic processor unit GPU and a memory, but it is not limited thereto. Therefore, one host system may include a plurality of graphic processor units GPU and a plurality of memories. Further, in FIG. 6, it is described that the display apparatus 200 according to another exemplary embodiment of the present disclosure includes two display modules (first and second display module), but the number of display modules is not limited thereto.

Referring to FIG. 6, the display apparatus 2000 to which multi-chips are applied includes a plurality of controllers 210-1 and 210-2, and any one of the plurality of controllers (for example, the first controller 210-1) is a master controller and the other controller (for example, the second controller 210-2) may be a slave controller.

The master controller 210-1 receives first image data including a plurality of image frames from a corresponding host system (that is, the first host system 300-1) and the slave controller 210-2 receives second image data including a plurality of image frames from a corresponding host system (that is, the second host system 300-2). Each of the master controller 210-1 and the slave controller 210-2 includes the timing signal generator 211, the interface unit 212, the memory 213, and the data processor 214 which have been described above with reference to FIGS. 1 to 5.

First, a method of controlling the pixel driving of the first display panel 100-1 by the master controller 210-1 will be described in detail with reference to FIGS. 7 and 8.

Figure 7:
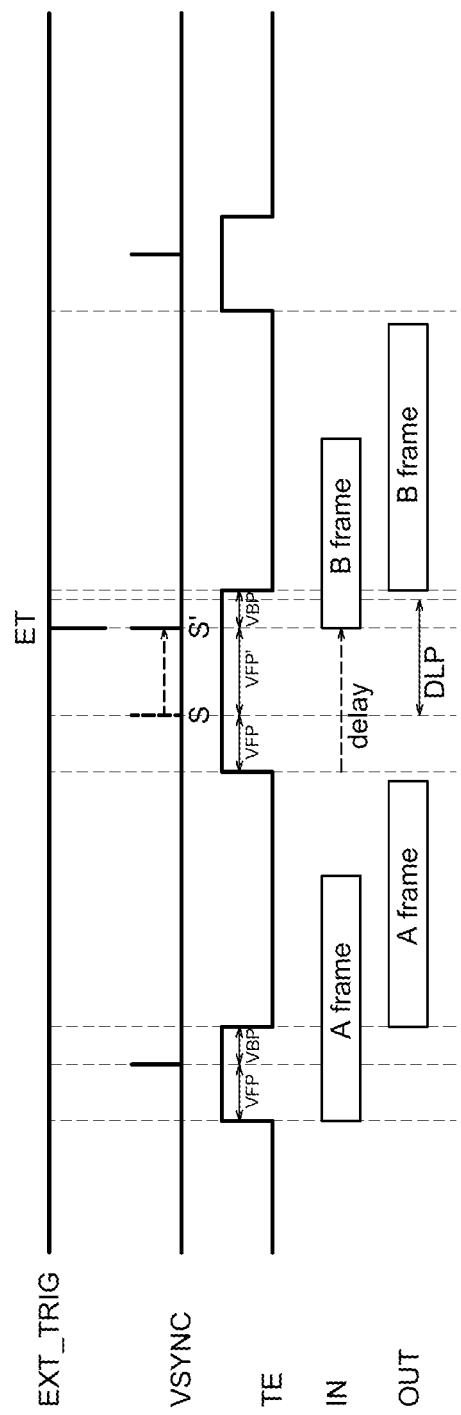
FIG. 7 is a timing diagram for explaining an example of a driving signal of a display apparatus according to another exemplary embodiment of the present disclosure.

FIG. 7 is a timing diagram for explaining an example of a driving signal of a display apparatus according to another exemplary embodiment of the present disclosure. FIG. 8 is a timing diagram for explaining another example of a driving signal of a display apparatus according to another exemplary embodiment of the present disclosure.

A reception start time of an N-th image frame (N is a natural number of 2 or larger) of first image data is delayed from a start time of an N-th frame synchronization signal. At this time, the timing signal generator 211 of the master controller 210-1 generates an internal timing signal and an external timing signal corresponding to the internal timing signal based on the reception start time of the N-th image frame.

In addition, the timing signal generator 211 of the master controller 210-1 controls a data signal corresponding to the N-th image frame or the N–1-th image frame stored in the memory 213 of the master controller 210-1 to be transmitted to the display panel 100-1 through the first data driver, based on the generated internal timing signal.

Further, the timing signal generator 211 of the master controller 210-1 transmits an external timing signal to the first host system 300-1.

Specifically, referring to FIG. 7, the timing signal generator 211 of the master controller 210-1 monitors the memory 213 of the master controller 210-1 in real time to detect a start time of receiving the N-th image frame (that is, image frame B (B frame)) which is currently received (that is, a start time of writing the image frame B (B frame) in the memory 213 of the master controller 210-1). Further, the image frame B (B frame) is detected within a delay limit period (VFP+DLP) from a start time of the frame synchronization signal TE. At this time, the timing signal generator 211 of the master controller 210-1 generates a vertical synchronization signal S' which is an internal timing signal so as to correspond to an actual reception start time of the image frame B (B frame).

That is, as illustrated in FIG. 7, a vertical synchronization signal S which needs to be generated at a time when the vertical front porch (VFP) elapses from a start time of the frame synchronization signal TE for the image frame B (B frame) is not generated. However, the vertical synchronization signal (S') is delayed and generated at the time when the vertical front porch (VFP') has further elapsed from the time when the vertical synchronization signal S should have been generated. A data signal for the image frame B (B frame) is transmitted to the display panel 100 through the data driver 230 at a time when the vertical back porch VBP elapses from the delayed vertical synchronization signal S'.

At this time, the timing signal generator 211 of the master controller 210-1 generates an external synchronization signal EX as an external timing signal EXT_TRIG when the delayed vertical synchronization signal S' is generated.

Figure 8:
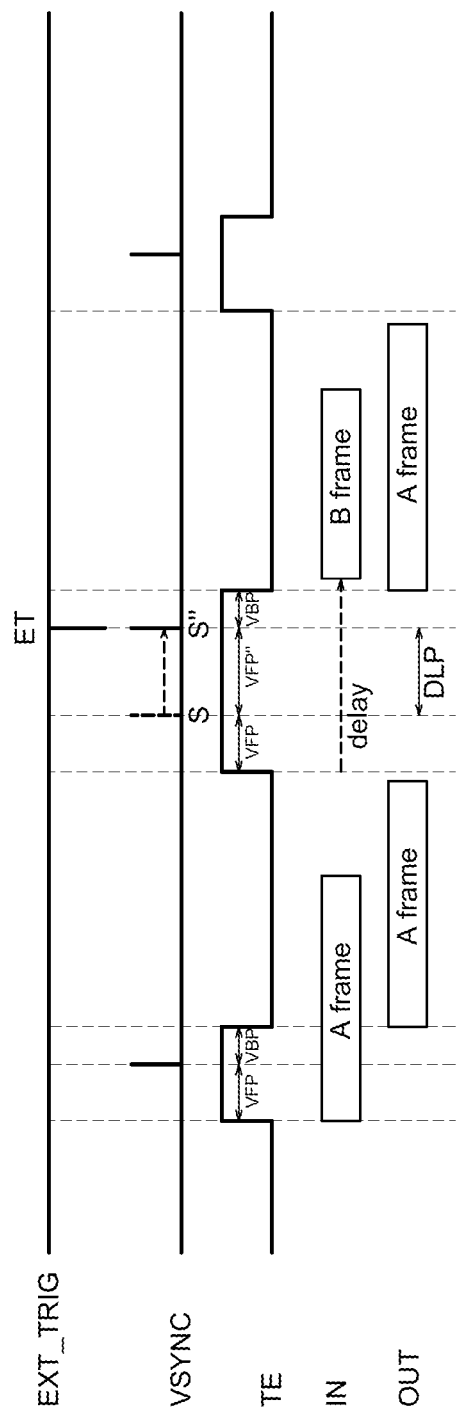
FIG. 8 is a timing diagram for explaining another example of a driving signal of a display apparatus according to another exemplary embodiment of the present disclosure.

Further, referring to FIG. 8, the timing signal generator 211 of the master controller 210-1 monitors the memory 213 of the master controller 210-1 in real time to detect a start time of receiving the N-th image frame (that is, image frame B (B frame)) which is currently received (that is, a start time of writing the image frame B (B frame) in the memory 213). Further, when the image frame B (B frame) is detected after a delay limit period (VFP+DLP) from a start time of the frame synchronization signal TE, the timing signal generator 211 of the master controller 210-1 cancels storing of the image frame B (B frame) in the memory 213 and generates a vertical synchronization signal S" which is an internal timing signal so as to correspond to an end time of the delay limit period VFP+DLP.

That is, as illustrated in FIG. 8, a vertical synchronization signal S which needs to be generated at a time when the vertical front porch (VFP) elapses from a start time of the frame synchronization signal TE for the image frame B (B frame) is not generated. However, the vertical synchronization signal (S") is delayed and generated at the time when the vertical front porch (VFP") has further elapsed from the time when the vertical synchronization signal S should have been generated. A data signal for an image frame A (frame A) which is a previous image frame, rather than the image frame B (B frame), is transmitted to the display panel 100 through the data driver 230 at a time when the vertical back porch VBP elapses with respect to the delayed vertical synchronization signal S".

At this time, the timing signal generator 211 of the master controller 210-1 generates an external synchronization signal EX as an external timing signal EXT_TRIG when the delayed vertical synchronization signal S" is generated.

Referring to FIG. 6 again, the external timing signal EXT_TRIG generated by the master controller 210-1 is transmitted from the master controller 210-1 to the first host system 300-1 and is transmitted from the first host system 300-1 to the slave controller 210-2. Therefore, the external timing signal is used as a synchronization signal for pixel driving when input image data in the slave controller 210-2 is delayed.

Next, a method of controlling the pixel driving of the first display panel 100-2 by the slave controller 210-2 will be described in detail with reference to FIGS. 9 to 13.

FIGS. 9 to 13 are timing diagrams for explaining various examples of a driving signal of a display apparatus to which multi-chips are applied, according to another exemplary embodiment of the present disclosure.

In FIGS. 9 to 13, driving signals in a first display panel driving circuit chip 200-1 including a master controller 210-1 and a second display panel driving circuit chip 200-2 including a slave controller 210-2 are compared to be illustrated.

The timing signal generator 211 of the slave controller 210-2 generates an internal timing signal based on at least one of a period when a reception start time of an M-th image frame (M is a natural number of 2 or larger) of second image data is delayed from a start time of an M-th frame synchronization signal and a reception time of an external timing signal.

In addition, the timing signal generator 211 of the slave controller 210-2 controls the data signal corresponding to the M-th image frame or the M−1-th image frame stored in the memory 213 of the slave controller 210-2 to be transmitted to the second display panel 100-2, based on the generated internal timing signal.

Figure 9:
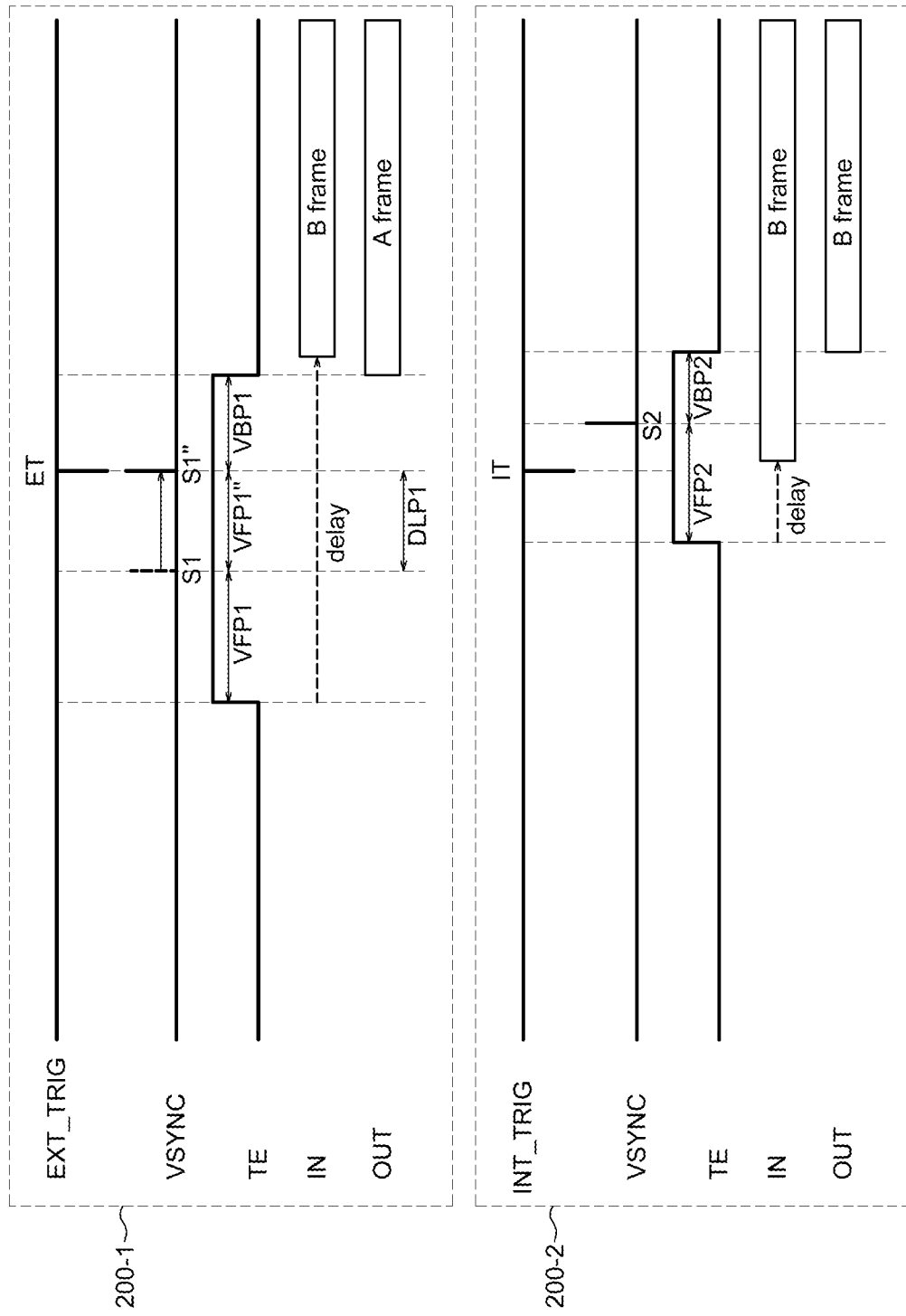
FIG. 9 is a timing diagram for explaining an example of a driving signal of a display apparatus to which multi-chips are applied, according to another exemplary embodiment of the present disclosure.
Figure 10:
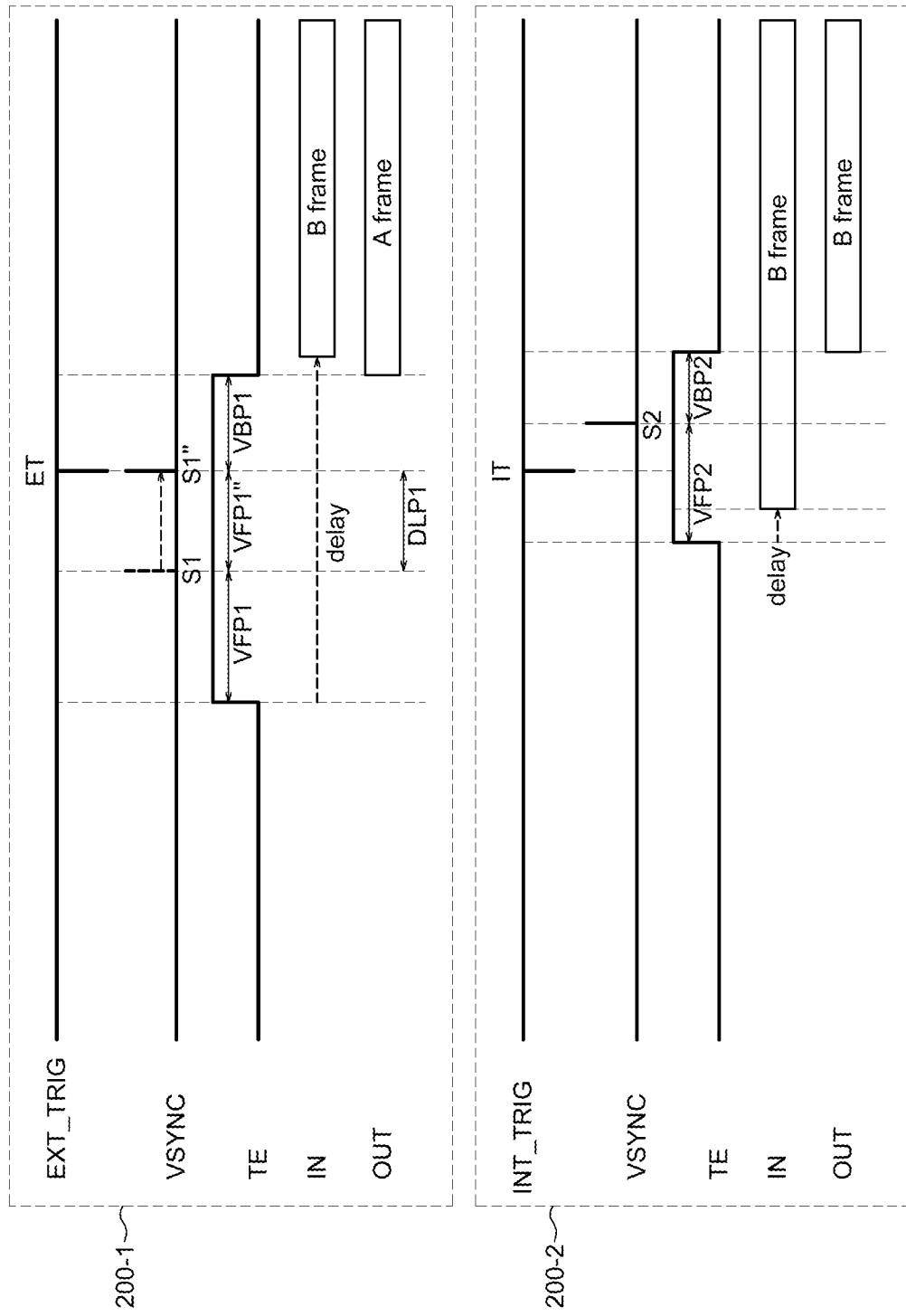
FIG. 10 is a timing diagram for explaining another example of a driving signal of a display apparatus according to another exemplary embodiment of the present disclosure.

Specifically, referring to FIGS. 9 and 10, the timing signal generator 211 of the master controller 210-1 included in the first display panel driving circuit chip 200-1 generates an internal timing signal which is adaptively adjusted to the delayed image frame in the method described in FIG. 8, that is, a delayed vertical synchronization signal S1". Further, the timing signal generator 211 generates an external timing signal EXT_TRIG corresponding to the delayed vertical synchronization signal S1", that is, an external synchronization signal ET to transmit to the first host system 300-1.

The timing signal generator 211 of the slave controller 210-2 included in the second display panel driving circuit chip 200-2 receives the external synchronization signal ET which is the external timing signal EXT_TRIG from the first host system 300-1. The timing signal generator 211 of the slave controller 210-2 included in the second display panel driving circuit chip 200-2 generates an internal synchronization signal IT corresponding to the external synchronization signal ET at a time when the external synchronization signal ET is received.

When the reception start time of the image frame B (B frame) of the second image data is detected within a period delayed from the start time of the frame synchronization signal TE and a reception time of the external timing signal EXT_TRIG (that is, a time when the internal synchronization signal IT is generated) is detected within a predetermined reference timing signal generation period VFP2 from the start time of the frame synchronization signal TE, the timing signal generator 211 of the slave controller 210-2 generates the vertical synchronization signal S2 which is an internal timing signal VSYNC at an end time of the reference timing signal generation period VFP2.

In FIG. 9, it is illustrated that a reception time of the external timing signal EXT_TRIG (that is, a time when the internal synchronization signal IT is generated) precedes a reception start time of the image frame B (B frame) of the second image data. In contrast, in FIG. 10, it is illustrated that a reception start time of the image frame B (B frame) of the second image data precedes a reception time of the external timing signal EXT_TRIG (that is, a time when the internal synchronization signal IT is generated). However, in both FIGS. 9 and 10, the reception start time of the image frame B (B frame) of the second image data and the time when the internal synchronization signal IT is generated are detected within the reference timing signal generation period VFP2. Therefore, the timing signal generator 211 of the slave controller 210-2 generates the vertical synchronization signal S2 which is an internal timing signal VSYNC at the end time of the reference timing signal generation period VFP2 without being delayed.

A data signal for the image frame B (B frame) is transmitted to the second display panel 100-2 through the data driver 230 included in the second display panel driving circuit chip 200-2 at a time when the vertical back porch VBP2 elapses from the vertical synchronization signal S2 generated as described above.

Figure 11:
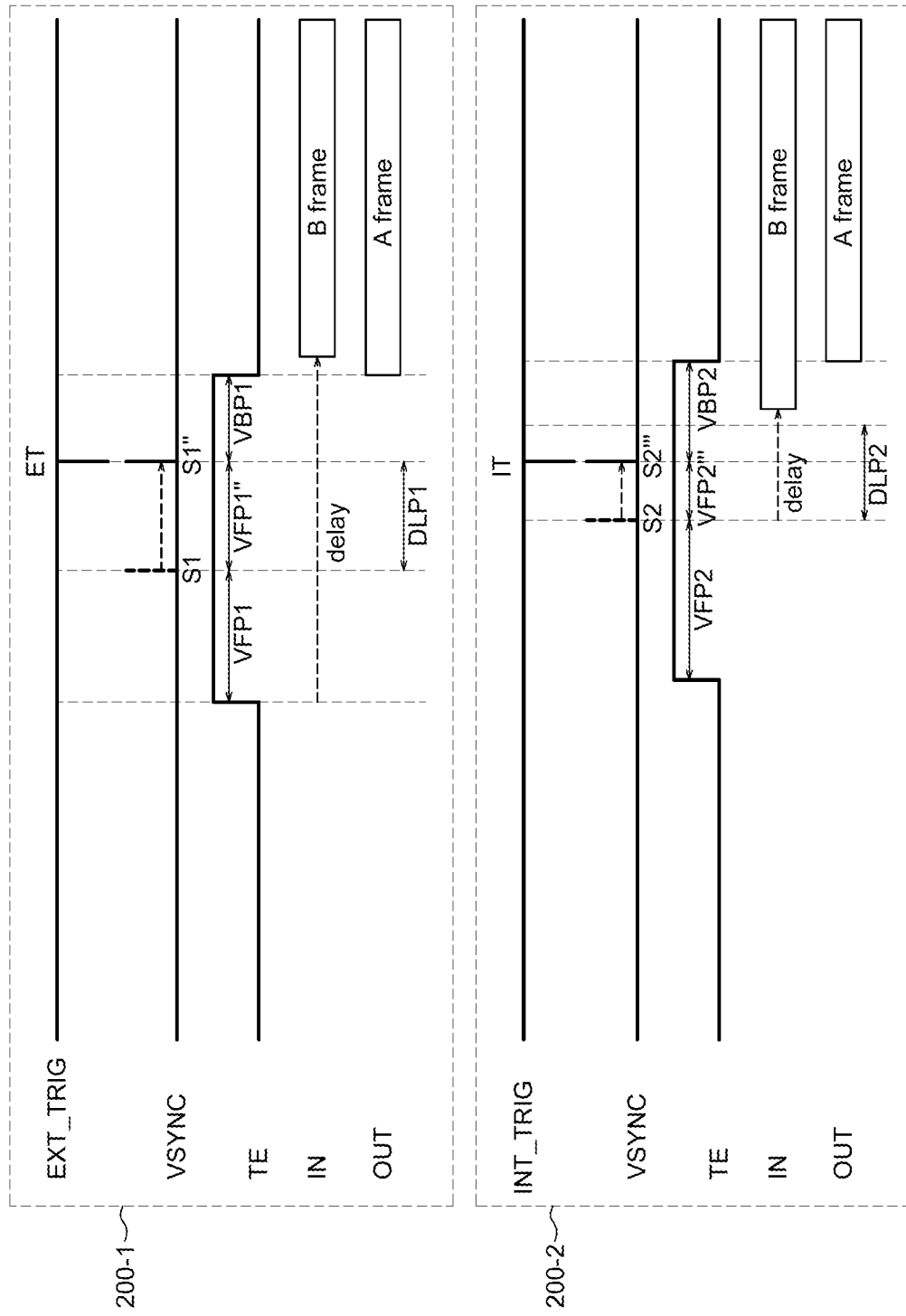
FIG. 11 is a timing diagram for explaining another example of a driving signal of a display apparatus according to still another exemplary embodiment of the present disclosure.
Figure 12:
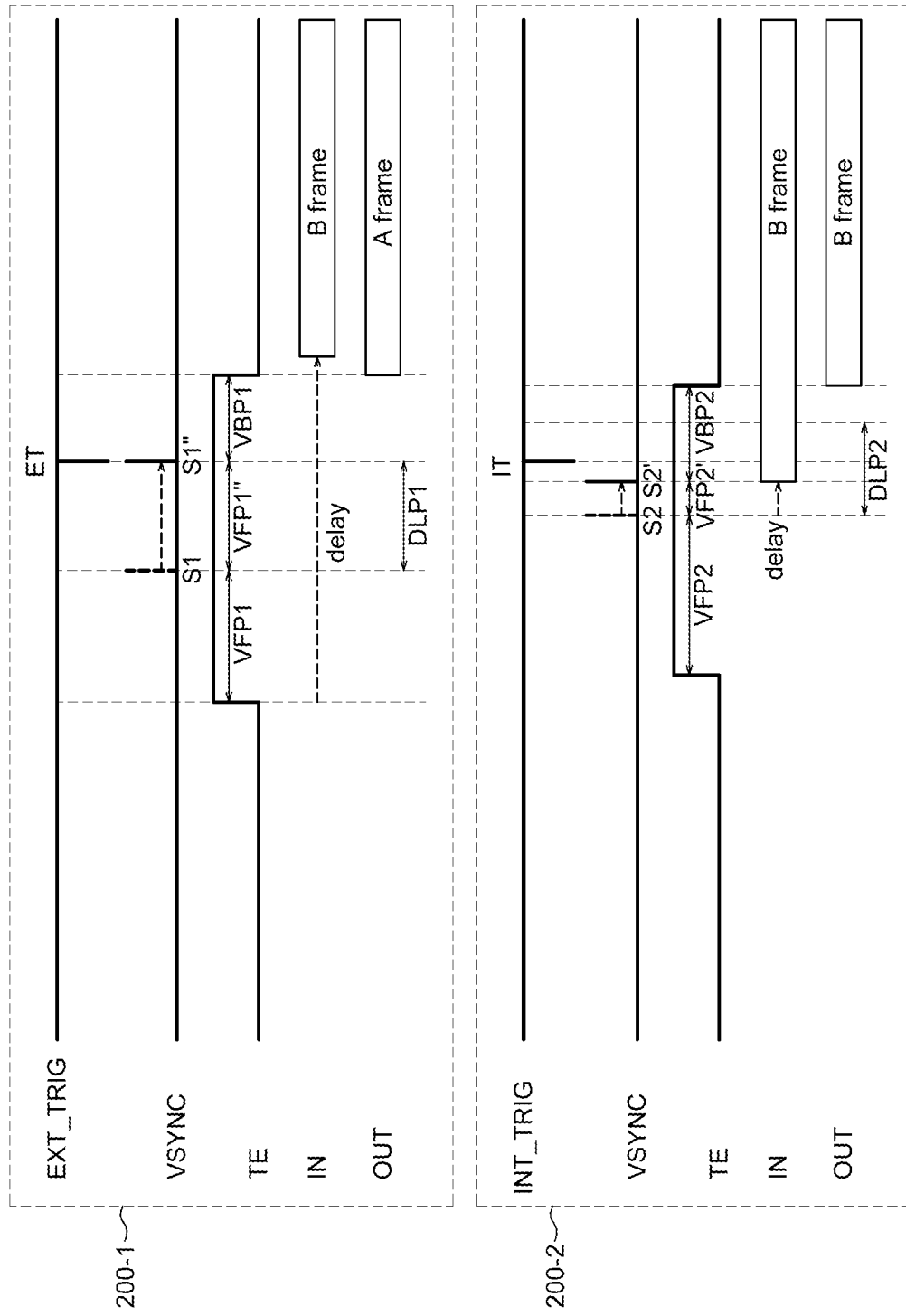
FIG. 12 is a timing diagram for explaining still another example of a display driving signal according to another exemplary embodiment of the present disclosure.
Figure 13:
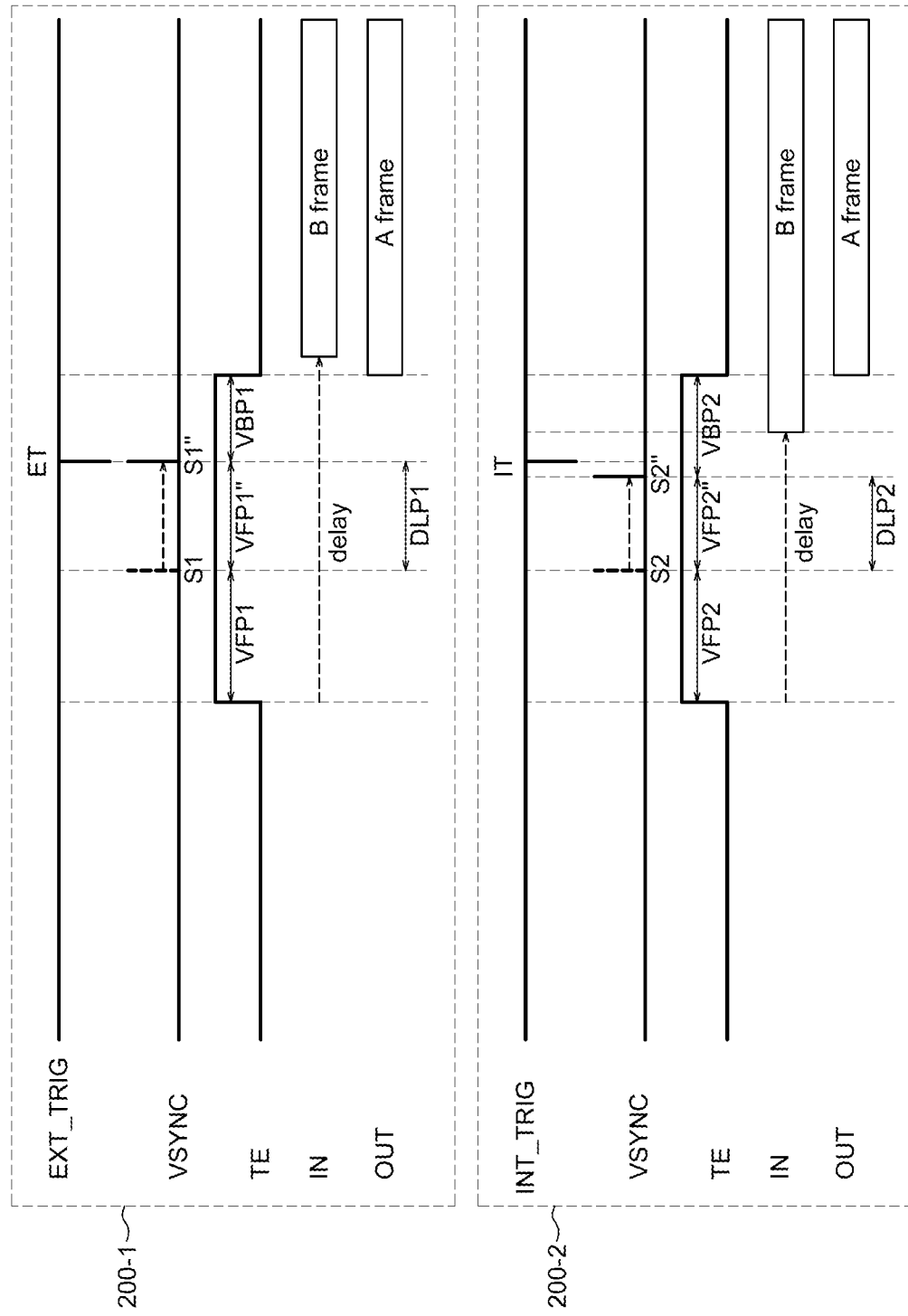
FIG. 13 is a timing diagram for explaining still another example of a driving signal of a display apparatus according to another exemplary embodiment of the present disclosure.

Further, referring to FIGS. 11 to 13, any one of a period in which the reception start time of the image frame B (B frame) of the second image data is delayed from the start time of the frame synchronization signal TE and a reception time of the external timing signal EXT_TRIG (that is, a time when the internal synchronization signal IT is generated) is detected after a reference timing signal generation period VFP2 from the start time of the frame synchronization signal TE. At this time, the timing signal generator 211 of the slave controller 210-2 detects a position of the reception start time of the image frame B (B frame) and the reception time of the external timing signal EXT_TRIG (that is, a time when the internal synchronization signal IT is generated) based on a predetermined delay limit period VFP2+DLP2 which exceeds the reference timing signal generation period.

In addition, any one of the reception start time of the image frame B (B frame) of the second image data and a reception time of the external timing signal EXT_TRIG (that is, a time when the internal synchronization signal IT is generated) is detected within the delay limit period VFP2+DLP2. At this time, the timing signal generator 211 of the slave controller 210-2 generates the internal timing signal at a time corresponding to one of two detected times. Further, the timing signal generator 211 of the slave controller 210-2 controls the data signal corresponding to an image frame B (B frame) of second image data stored in the memory 213 of the slave controller 210-2 or the image frame A (A frame) which is a previous image frame to be transmitted to the second display panel 100-2 through the data driver 230 included in the second display panel driving circuit chip 200-2 based on the generated internal timing signal.

Specifically, referring to FIGS. 11 and 12, the timing signal generator 211 of the master controller 210-1 included in the first display panel driving circuit chip 200-1 generates an internal timing signal which is adaptively adjusted to the delayed image frame in the method described in FIG. 8, that is, a delayed vertical synchronization signal S1". Further, the timing signal generator 211 generates an external timing signal EXT_TRIG corresponding to the delayed vertical synchronization signal S1", that is, an external synchronization signal ET to transmit to the first host system 300-1.

The timing signal generator 211 of the slave controller 210-2 included in the second display panel driving circuit chip 200-2 receives the external synchronization signal ET which is the external timing signal EXT_TRIG from the first host system 300-1. The timing signal generator 211 of the slave controller 210-2 included in the second display panel driving circuit chip 200-2 generates an internal synchronization signal IT corresponding to the external synchronization signal ET at a time when the external synchronization signal ET is received.

FIG. 11 illustrates that both the reception start time of the image frame B (B frame) of the second image data and the reception time of the external timing signal EXT_TRIG are detected after the reference timing signal generation period VFP2. Further, FIG. 11 illustrates that the reception time of the external timing signal EXT_TRIG is detected within the delay limit period VFP2+DLP2, and the reception start time of the image frame B (B frame) of the second image data is detected after the delay limit period VFP2+DLP2.

At this time, the timing signal generator 211 of the slave controller 210-2 cancels storing of the image frame B (B frame) of the second image data in the memory 213 of the slave controller 210-2 and generates a vertical synchronization signal S2" which is the internal timing signal, in response to the reception time of the external timing signal EXT_TRIG (that is, a time when the internal synchronization signal IT is generated).

That is, as illustrated in FIG. 11, a vertical synchronization signal S2 which needs to be generated at a time when the vertical front porch (VFP2) elapses from a start time of the frame synchronization signal TE for the image frame B (B frame) is not generated. However, the vertical synchronization signal (S2''') is delayed and generated at the time when the vertical front porch (VFP2''') has further elapsed (that is, the time when the internal synchronization signal IT is generated) from the time when the vertical synchronization signal S2 should have been generated. A data signal for an image frame A (A frame) which is a previous image frame, rather than the image frame B (B frame) of the second image data, is transmitted to the second display panel 100-2 through the data driver 230 of the second display panel driving circuit chip 200-2 at a time when the vertical back porch VBP2 elapses from the delayed vertical synchronization signal S'''.

In FIG. 12, it is illustrated that both the reception start time of the image frame B (B frame) of the second image data and the reception time of the external timing signal EXT_TRIG exceed the reference timing signal generation period VFP2 and are detected within the delay limit period VFP2+DLP2.

At this time, the timing signal generator 211 of the slave controller 210-2 generates the vertical synchronization signal S2' which is an internal timing signal, in response to the start time of receiving the image frame B (B frame) of the second image data.

That is, as illustrated in FIG. 12, a vertical synchronization signal S2 which needs to be generated at a time when the vertical front porch (VFP2) elapses from a start time of the frame synchronization signal TE for the image frame B (B frame) is not generated. However, the vertical synchronization signal (S2') is delayed and generated at the time when the vertical front porch (VFP2') has further elapsed (that is, the reception start time of the image frame B (B frame)) from the time when the vertical synchronization signal S2 should have been generated. A data signal for the image frame B (B frame) of the second image data is transmitted to the second display panel 100-2 through the data driver 230 of the second display panel driving circuit chip 200-2 at a time when the vertical back porch VBP2 elapses from the delayed vertical synchronization signal S2' generated.

Further, referring to FIG. 13, the timing signal generator 211 of the master controller 210-1 included in the first display panel driving circuit chip 200-1 generates an internal timing signal which is adaptively adjusted to the delayed image frame in the method described in FIG. 8, that is, a delayed vertical synchronization signal S1". Further, the timing signal generator 211 generates an external timing signal EXT_TRIG corresponding to the delayed vertical synchronization signal S1", that is, an external synchronization signal ET to transmit to the first host system 300-1.

The timing signal generator 211 of the slave controller 210-2 included in the second display panel driving circuit chip 200-2 receives the external synchronization signal ET which is the external timing signal EXT_TRIG from the first host system 300-1. The timing signal generator 211 of the slave controller 210-2 included in the second display panel driving circuit chip 200-2 generates an internal synchronization signal IT corresponding to the external synchronization signal ET at a time when the external synchronization signal ET is received.

In FIG. 13, it is illustrated that both the reception start time of the image frame B (B frame) of the second image data and the reception time of the external timing signal EXT_TRIG are detected after the reference timing signal generation period VFP2 and the delay limit period VFP2+DLP2.

At this time, the timing signal generator 211 of the slave controller 210-2 cancels storing of the image frame B (B frame) of the second image data in the memory 213 of the slave controller 210-2 and generates a vertical synchronization signal S2" which is the internal timing signal, in response to the end time of the delay limit period VFP2+DLP2.

That is, as illustrated in FIG. 13, a vertical synchronization signal S2 which needs to be generated at a time when the vertical front porch (VFP2) elapses from a start time of the frame synchronization signal TE for the image frame B (B frame) is not generated. However, the vertical synchronization signal (S2") is delayed and generated at the time when the vertical front porch (VFP2") has further elapsed (that is, the end time of the delay limit period VFP2+DLP2) from the time when the vertical synchronization signal S2 should have been generated. A data signal for an image frame A (frame A) which is a previous image frame, rather than the image frame B (B frame) of the second image data, is transmitted to the second display panel 100-2 through the data driver 230 of the second display panel driving circuit chip 200-2 at a time when the vertical back porch VBP2 elapses from the delayed vertical synchronization signal S".

As described above, when the transmission of the input image frame to a corresponding controller, among the plurality of controllers 210-1 and 210-2 from at least one of the host systems 300-1 and 300-2 is delayed, the display apparatus 2000 according to another exemplary embodiment of the present disclosure adaptively adjusts a generation time of the internal synchronization signal according to a delayed condition. By doing this, even in the display apparatus 2000 to which multi-chips are applied, the tearing effect which is a display mosaic problem caused by the overlapping the delayed image frame and the previous image frame may be suppressed. Further, in the display apparatus 2000 to which multi-chips are applied, a driving signal which suppresses the display tearing effect may be synchronized between the plurality of display panel driving circuit chips.

The exemplary embodiments of the present disclosure can also be described as follows:

According to an aspect of the present disclosure, there is provided a display apparatus. The display apparatus includes at least one display panel including a pixel array configured by a plurality of pixels. The display apparatus further includes at least one controller which receives image data from a host system and controls the driving of the display panel to display the image data. The controller transmits a frame synchronization signal notifying a transmission start time for every image frame included in the image data to the host system, detects a reception start time for an image frame received from the host system, and delays a transmission start time of a data signal corresponding to the image frame to the display panel based on a difference between a start time of the frame synchronization signal and the reception start time.

The controller may include: a memory which stores the image data in the unit of image frame, and a timing signal generator which generates the frame synchronization signal for a subsequent image frame in response to a time when the data signal is completely transmitted to the display panel.

When a start time of receiving an N-th image frame (N is a natural number of 2 or larger) from the host system is detected within a predetermined delay limit period from a start time of an N-th frame synchronization signal, the timing signal generator may generate an internal timing signal so as to correspond to a reception start time of the N-th image frame and control the data signal corresponding to the N-th image frame stored in the memory to be transmitted to the display panel based on the internal timing signal.

When a start time of receiving an N-th image frame (N is a natural number of 2 or larger) from the host system is detected after a predetermined delay limit period from a start time of an N-th frame synchronization signal, the timing signal generator may cancel storing of the N-th image frame in the memory, generate an internal timing signal so as to correspond to an end time of the delay limit period and control the data signal corresponding to an N−1-th image frame stored in the memory to be transmitted to the display panel based on the internal timing signal.

When the plurality of controllers is provided, one of the plurality of controllers may be a master controller which receives first image data including a plurality of image frames from the host system and the remaining may be a slave controller which receives second image data including a plurality of image frames from the host system and each of the master controller and the slave controller may include the memory and the timing signal generator.

When one display panel is provided, the plurality of controllers may control driving of different areas of a plurality of areas of the display panel.

When a plurality of display panels is provided, the plurality of controllers may control driving of different display panels of the plurality of the display panels.

When a reception start time of an N-th image frame (N is a natural number of 2 or larger) of the first image data is delayed from a start time of an N-th frame synchronization signal, the timing signal generator of the master controller may generate an internal timing signal based on the reception start time of the N-th image frame and an external timing signal corresponding to the internal timing signal and control a data signal corresponding to the N-th image frame or an N−1-th image frame stored in a memory of the master controller to be transmitted to the display panel based on the internal timing signal, and transmit the external timing signal to the host system.

The timing signal generator of the slave controller may receive the external timing signal from the host system, generate an internal timing signal based on at least one of a period in which a reception start time of a M-th image frame (M is a natural number of 2 or larger) of the second image data is delayed from a start time of a M-th frame synchronization signal and a reception time of the external timing signal, and control a data signal corresponding to the M-th image frame or an M−1-th image frame stored in the memory of the slave controller to be transmitted to the display panel based on the internal timing signal.

When at least one of the reception time of the external timing signal and the reception start time of the M-th image frame is detected within a predetermined reference timing signal generation period from a start time of the M-th frame synchronization signal, the timing signal generator of the slave controller may generate the internal timing signal at the end time of the reference timing signal generation period and control a data signal corresponding to the M-th image frame stored in the memory of the slave controller to be transmitted to the display panel based on the internal timing signal.

When any one of a reception time of the external timing signal and a reception start time of the M-th image frame is detected within a predetermined delay limit period after the reference timing signal generation period, the timing signal generator of the slave controller may generate the internal timing signal at a time corresponding to any one of the reception time of the external timing signal and the reception start time of the M-th image frame and control a data signal corresponding to the M-th image frame or an M−1-th image frame stored in the memory of the slave controller to be transmitted to the display panel based on the internal timing signal.

When a reception time of the external timing signal is detected within the delay limit period and the reception start time of the M-th image frame is detected after the delay limit period, the timing signal generator of the slave controller may cancel storing of the M-th image frame in a memory of the slave controller, generate the internal timing signal in response to the reception time of the external timing signal, and control a data signal corresponding to the M−1-th image frame stored in the memory of the slave controller to be transmitted to the display panel based on the internal timing signal.

When the reception time of the external timing signal and the reception start time of the M-th image frame are detected after the delay limit period, the timing signal generator of the slave controller may cancel storing of the M-th image frame in a memory of the slave controller, generate the internal timing signal in response to the end time of the delay limit period, and control a data signal corresponding to the M−1-th image frame stored in the memory of the slave controller to be transmitted to the display panel based on the internal timing signal.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope of the embodiments described herein should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:
at least one display panel including a pixel array of a plurality of pixels; and
at least one controller configured to receive image data from a host system and to control driving of the at least one display panel to display the image data,
wherein in operation the at least one controller transmits a frame synchronization signal notifying a transmission start time for an image frame included in the image data to the host system, detects a reception start time for the image frame received from the host system, and delays a transmission start time of a data signal corresponding to the image frame to the display panel based on a difference between a start time of the frame synchronization signal and the reception start time,
wherein the controller includes:
a memory configured to store the image data in the image frame; and
a timing signal generator configured to generate a frame synchronization signal for a subsequent image frame in response to a time when the data signal is completely transmitted to the display panel,
wherein the at least one controller includes a plurality of controllers, one of the plurality of controllers is a master controller configured to receive first image data including a plurality of image frames from the host system and a remaining controller of the plurality of controllers is a slave controller configured to receive second image data including a plurality of image frames from the host system, and each of the master controller and the slave controller includes the memory and the timing signal generator, and
wherein when a reception start time of an N-th image frame of the first image data is delayed from a start time of an N-th frame synchronization signal, the timing signal generator of the master controller generates an internal timing signal based on the reception start time of the N-th image frame and an external timing signal corresponding to the internal timing signal and controls a data signal corresponding to the N-th image frame or an (N−1)-th image frame stored in a memory of the master controller to be transmitted to the display panel based on the internal timing signal, and transmits the external timing signal to the host system, wherein N is a natural number of 2 or larger.

2. The display apparatus according to claim 1, wherein when a start time of receiving an Nth image frame from the host system is detected within a predetermined delay limit period from a start time of an N-th frame synchronization signal, the timing signal generator generates an internal timing signal so as to correspond to a reception start time of the N-th image frame and controls the data signal corresponding to the N-th image frame stored in the memory to be transmitted to the display panel based on the internal timing signal, wherein N is a natural number of 2 or larger.

3. The display apparatus according to claim 1, wherein when a start time of receiving an Nth image frame from the host system is detected after a predetermined delay limit period from a start time of an Nth frame synchronization signal, the timing signal generator cancels storing of the Nth image frame in the memory, generates an internal timing signal so as to correspond to an end time of the delay limit period and controls the data signal corresponding to an (N−1)-th image frame stored in the memory to be transmitted to the display panel based on the internal timing signal, wherein N is a natural number of 2 or larger.

4. The display apparatus according to claim 1, wherein the at least one display panel includes one display panel, and the plurality of controllers each controls driving of a different area of a plurality of areas of the display panel.

5. The display apparatus according to claim 1, wherein the at least one display panel includes a plurality of display panels, and the plurality of controllers each controls driving of a different display panel of the plurality of display panels.

6. The display apparatus according to claim 1, wherein the timing signal generator of the slave controller receives the external timing signal from the host system, generates an internal timing signal based on at least one of a period in which a reception start time of a M-th image frame of the second image data is delayed from a start time of a M-th frame synchronization signal and a reception time of the external timing signal, and controls a data signal corresponding to the M-th image frame or an (M−1)-th image frame stored in the memory of the slave controller to be transmitted to the display panel based on the internal timing signal, wherein M is a natural number of 2 or larger.

7. The display apparatus according to claim 6, wherein when at least one of the reception time of the external timing signal and the reception start time of the M-th image frame is detected within a predetermined reference timing signal generation period from a start time of the M-th frame synchronization signal, the timing signal generator of the slave controller generates the internal timing signal at an end time of the reference timing signal generation period and controls a data signal corresponding to the M-th image frame stored in the memory of the slave controller to be transmitted to the display panel based on the internal timing signal.

8. The display apparatus according to claim 7, wherein when any one of a reception time of the external timing signal and a reception start time of the M-th image frame is detected within a predetermined delay limit period after the reference timing signal generation period, the timing signal generator of the slave controller generates the internal timing signal at a time corresponding to any one of the reception time of the external timing signal and the reception start time of the M-th image frame and controls a data signal corresponding to the M-th image frame or an (M−1)-th image frame stored in the memory of the slave controller to be transmitted to the display panel based on the internal timing signal.

9. The display apparatus according to claim 8, wherein when a reception time of the external timing signal is detected within the predetermined delay limit period and the reception start time of the M-th image frame is detected after the predetermined delay limit period, the timing signal generator of the slave controller cancels storing of the M-th image frame in a memory of the slave controller, generates the internal timing signal in response to the reception time of the external timing signal, and controls a data signal corresponding to the (M−1)-th image frame stored in the memory of the slave controller to be transmitted to the display panel based on the internal timing signal.

10. The display apparatus according to claim 8, wherein when the reception time of the external timing signal and the reception start time of the M-th image frame are detected after the predetermined delay limit period, the timing signal generator of the slave controller cancels storing of the M-th image frame in a memory of the slave controller, generates the internal timing signal in response to the end time of the predetermined delay limit period, and controls a data signal corresponding to the (M−1)-th image frame stored in the memory of the slave controller to be transmitted to the display panel based on the internal timing signal.

* * * * *